Feb. 27, 1962  H. M. LEWIS  3,022,802
REENFORCED HOLLOW CIRCULAR PLASTIC OBJECTS
Filed Nov. 8, 1954  2 Sheets-Sheet 1
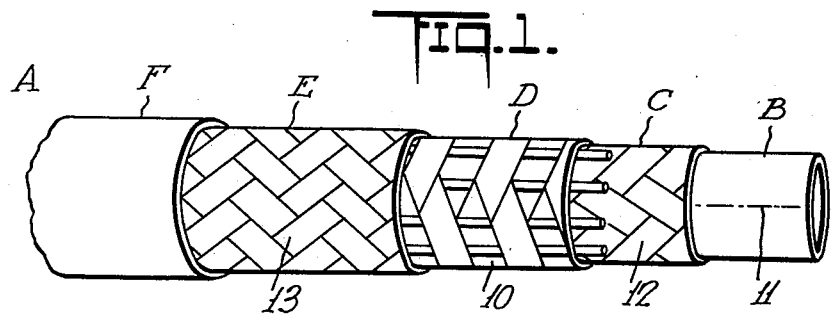
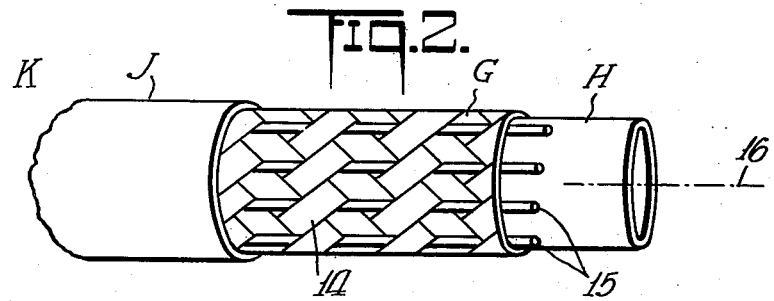
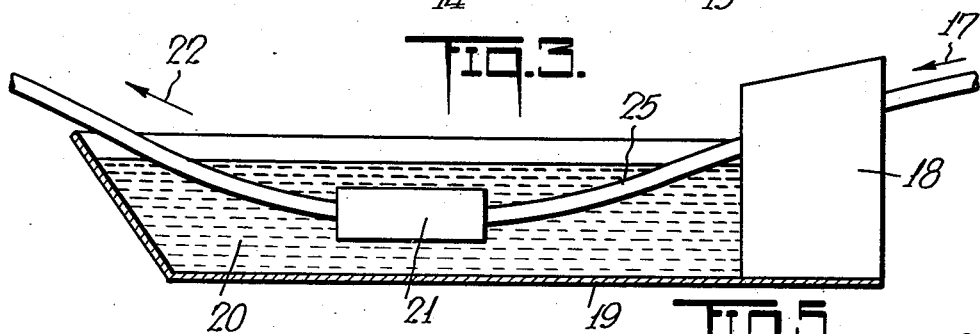
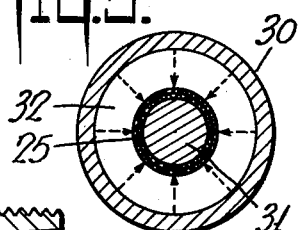
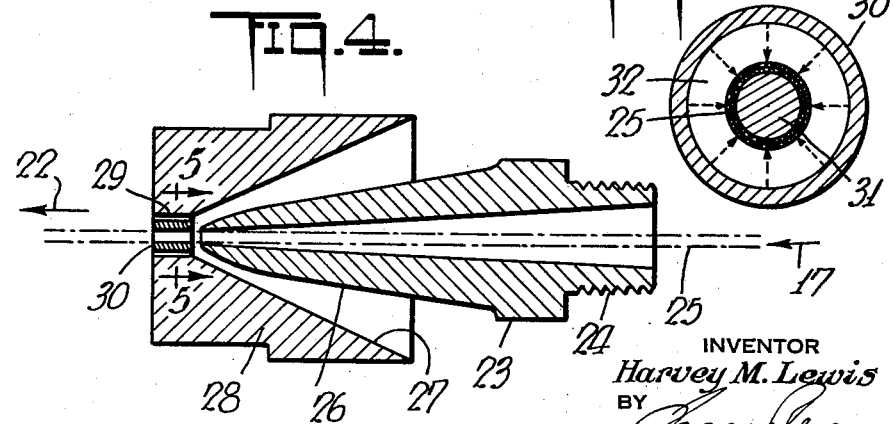
INVENTOR
Harvey M. Lewis
BY
ATTORNEY Feb. 27, 1962 H. M. LEWIS 3,022,802
REENFORCED HOLLOW CIRCULAR PLASTIC OBJECTS
Filed Nov. 8, 1954 2 Sheets-Sheet 2

INVENTOR
*Harvey M. Lewis*
BY
ATTORNEY 3,022,802
REENFORCED HOLLOW CIRCULAR
PLASTIC OBJECTS
Harvey M. Lewis, 420 E. 79th St., New York 21, N.Y.
Filed Nov. 8, 1954, Ser. No. 467,506
4 Claims. (Cl. 138—125)

The present invention relates to a system and particularly to a procedure and mechanism for forming hollow circular objects, and more particularly it relates to reenforced hollow circular plastic objects or elongated material.

Although the present invention has broad application to the formation of reenforced plastic articles in general, whether in the form of plates or other structures, it has a particular application to circular articles and it will be especially described in its application to the manufacture of reenforced plastic piping.

It is among the objects of the present invention to provide a novel reenforced hollow circular article and particularly elongated plastic tubing and piping which will be resistant to corrosive gases and liquids, and which at the same time may be produced at low cost and at a high rate of production with great uniformity.

Another object is to provide a procedure for forming reenforced plastic tubing or piping in which plastic material may be reenforced substantially simultaneously with the manufacture thereof, and in which tubing and piping of great strength and resistance may be substantially automatically produced with a minimum of manual processing and finishing.

Another object is to provide a novel resin or plastic impregnating or combination procedure in which reenforcing material may be substantially simultaneously impregnated and coated with a plastic insoluble or infusible, with assurance that the reenforcement material will be substantially, completely and thoroughly incorporated in the plastic mass and solidified therein.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to form an interlaced fibrous reenforcement for a plastic material and then to impregnate and solidify such interlaced fibrous material with the plastic in soluble or fusible condition, with sufficient plastic being used to form a coating or film of substantial thickness over the inside and the outside of the article being formed.

In the preferred form fibres and yarns of natural or synthetic character, such as rayon, cellulose acetate, wool, cotton, silk or other synthetic or natural fibres may be used. It has been found satisfactory to use 100% or a substantial proportion between 25 and 50% of a high denier absorptive rayon of the regenerated cellulosic type, braided into tubular form with the tubular braid having an approximate diameter intermediate between the inside and the outside diameters of the circular article or of the piping or tubing which is to be formed.

It has been found that the braided article has sufficient flexibility and looseness of yarn and fibre to enable thorough impregnation, and at the same time the strands, fibres and yarns are so directed as to give the maximum oblique reenforcement to the piping, tubular or circular structure.

Normally, separate strands, fibres or rovings, whether arranged longitudinally or peripherally or helically or spirally, do not give maximum reenforcement to the tubular plastic structure. The relatively diverse braided structure of the yarn appears to give not only more satisfactory impregnation but also reenforcement, and there is a close and substantially integral bond between the braided yarns and the plastic material.

Although many types of plastic may be employed it has been found that an external and internal coating of epoxy and/or polyester resins is most satisfactory.

In some instances the epoxy or polyester resins may be impregnated into the synthetic or natural yarns before or after braiding and before curing.

The polyester resins which have been found to be most satisfactory for use in the present invention are those which consist of a polyhydroxy aliphatic alcohol which has been combined with or esterified with a plurality of aromatic and aliphatic acid such as linoleic acid, linolenic acid, citric acid, malic acid, maleic acid, fumaric acid or other similar organic acids.

These polyester resins my be combined with monomeric styrene and are applied to the yarn or fibre before or after braiding and finally cured after a tubular structure has been formed of suitable thickness. Cobalt naphthenate may be used as a curing agent as may also various peroxides, such as benzoyl or ketone peroxides.

On the other hand, it is also possible to utilize various link chain ethylene oxide resinous materials such as those derived from polymerized ethylene oxide or epichlorhydrin with or without inclusion of phenol formaldehyde or urea formaldehyde initial condensation products. These resins may be combined with phenylene diamine or metaphenylene diamine as curing catalysts in small amounts.

These resinous materials in liquid or soluble condition may be readily impregnated into and laminated or cast upon the braided reenforcement. Generally, the procedure is first to cast molten or soluble plastic onto the the braided material with a resultant formation of a solid gel encasing said braided material.

The coating or lamination, when thermosetting resins are employed, is cured at a temperature of about 175° to 200° F. for thirty minutes or at 350° F. for one hour depending upon the strength which it is desired to obtain.

If desired, the curing can take place in two steps with low temperature curing taking place; 12 to 16 hours at an elevated room temperature or at 15 to 20 minutes at about 190 to 200° followed by an elevated temperature curing.

In the curing operation ovens, infra-red lights or electric heating units may be employed and if desired air or mechanical pressures ranging up to 200 pounds per square inch may also be employed.

To assure thorough impregnation it has been found most satisfactory to use a very high frequency reciprocatory element for shaping or forming purposes.

For example, various types of piezo electric materials such as barium titanate may be used as extrusion nozzles through which the braid is passed while being impregnated and coated with the plastic.

A very high frequency hypersonic impregnation of this character assures that the plastic material will be thoroughly driven into the fibres of the braided material and at the same time will be uniformly coated around the outside of the braided material.

The resinous material is forced into the fibres as well in the spaces around the fibres in the yarns and into any recesses in the surfaces of the yarns.

Generally, about 1 to 4 parts of braided material are used for each 1 to 2 parts of plastic material, and in one embodiment it has been found most satisfactory to use a resin or plastic content of about 25 to 30% with a braided fabric content of 70 to 75%. However, the percentage by weight of the braided fabric may range from 35 to 90%.

Although barium titanate is the preferred forming or shaping nozzle material other ultrasonic transducer materials may be employed such as those formed of quartz, Rochelle salt or ammonium dihydrogen phosphate. Generally the forming piezo electric material is curved so that it will have a focus at the point where the impregnation is to be obtained.

Although single layer braided materials are preferred it has also been found possible to utilize multi-layer braided materials, in which case the braiding desirably of the various layers should be at a substantial angle to one another.

It has been found that the angle of the braiding should vary between 20° to 80° in respect to the longitudinal axis of the tubing or piping which is to be formed, with a preference of between 30° to 60°.

In addition to rayon or other synthetic or natural yarns, it is also possible to use glass yarn or fibre for the braiding base and it may be combined in equal proportions with rayon or the other fibres or used by itself. Metal fibres such as steel wool or copper or tin strands may also be employed for braiding purposes.

In addition to the oblique braided strands it is also possible to utilize longitudinal reenforcing strands which will penetrate between the braided elements.

The final hollow circular article of the present invention, composed of braided tubes of glass, yarn or rayon, or other natural or synthetic fibres encased in inner and outer tubular sheets of cured plastic materials, will resist high forces in tension either circumferentially or in a peripheral direction.

The tubing which is formed, particularly with longitudinal strands passing through the braiding, is highly resistant to shock fatigue in addition to radial or longitudinal distortion. By varying the tightness or looseness of the braiding it is also possible to greatly vary the longitudinal strength as well as resistance to helical stress.

Either thermosetting or thermoplastic resins may be readily employed. For thermosetting resins where temperatures do not exceed 150° F., ceramic transducers such as barium titanate may be employed. These ceramic transducers are satisfactory with a wide variety of polyester resins and epoxy resins.

In the case of extrusion machines, however, where temperatures rise above 300° F. it is necessary to use other types of impregnating devices such as magnetostriction oscillators which are of metallic construction and function satisfactorily at temperatures up to 300° C. These latter type of oscillators may be used to produce either sonic or ultrasonic waves.

Another feature of the present invention resides in the fact that the braided tubes or the yarns which form the braided tubes are heated before impregnation with the thermoplastic or thermosetting resin. If desired both the yarns may be heated as well as the braided tubes, and both the yarns as well as the tubes may be impregnated with the thermoplastic or thermosetting resins with or without the use of ceramic transducers, and with or without the use of magnetostriction oscillators. Generally the thermosetting resins are applied by using an impregnated bath, whereas with an extrusion machine thermoplastic resins and rubber compounds are employed. The impregnation which is applied to the yarns before braiding or after braiding may be readily applied to either the synthetic or natural fiber yarns as well as to glass or metal yarns or strands.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a side perspective view of one form of tubing according to the present invention in which there are concentric braided materials provided as a base upon which the plastic is cast or laminated, with the different layers of braiding being successively exposed.

FIG. 2 is a side perspective view similar to FIG. 1 in which there is shown an alternative braided construction with longitudinal or axial leaders or underbottoms braided into the reenforcing material.

FIG. 3 is a diagrammatic side sectional view of an impregnating mechanism showing the manner in which the braided material may be impregnated or coated with the liquified thermosetting resinous or plastic material.

FIG. 4 is a side sectional view upon an enlarged scale showing an extruding head or machine for final impregnation and forming of the impregnated and coated braided material with a thermoplastic resin or plastic.

FIG. 5 is a diagrammatic transverse sectional view upon an enlarged scale showing the manner in which the liquified resinous material is forced into the braided fabric.

Figure 6:
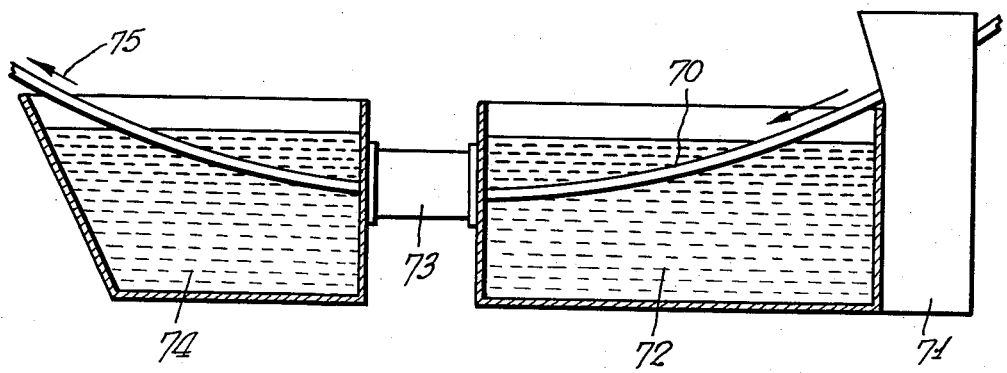
FIG. 6 is a diagrammatic side sectional view showing an alternative form of impregnating the braided tube.

Referring to FIG. 1 there is shown a plastic tube A having an inner coating or interior lining B of an epoxy or polyester resin, the intermediate reenforcement braided tubular member C, D and E and an outer coating F.

The resinous body B—F substantially extends integrally through the intermediate braided sections C, D and E so that the entire structure is substantially integral.

It will be noted that the angle at 10 on the intermediate braid D is more transverse to the longitudinal axis 11 than the angle 12 of the inner braid C or the angle 13 of the outer braid E.

Desirably, the outer braid E is more loosely braided while the intermediate braid D is more tightly braided to give the desired stress resistance pattern.

Desirably, the diameters of the braided tubing C, D and E are intermediate the diameter of the inside coating B and the outside coating F.

In FIG. 2 there is shown a central braiding G which is impregnated and covered by an inner resinous coating H and an outer resinous coating J to form a unitary tube K. The braiding G preferably has an angular direction at 14 of about 45° with spaced longitudinal strands of yarns 15 extending parallel to the axis 16.

In forming the plastic tubing A of FIG. 1, or K of FIG. 2, the braided material G or the triple superimposed braid C—D—E is formed and then passed in the direction indicated at 17 in FIG. 3 through a heating coil mechanism 18.

The tray 19 will be filled at 20 with a fused or liquified epoxy or polyester resin. This braided material will pick up resinous fluid from the bath 20 and will then pass through the hypersonic transducer 21 and then outwardly after thorough impregnation and coating as indicated by the arrow 22.

The hypersonic impregnating transducer is best shown in FIGS. 4 and 5. It includes a hollow screw head 23 having the threaded mounting portions 24 through which the braided tube 25 is fed with or without prior impregnation and heating.

The screw head 23 has an elongated conical nose 26 which fits into the conical chamber 27 inside of the die head 28. The die head 28 has an outlet opening 29 which receives the hypersonic transducer nipple or sleeve 30, preferably a magneto-restriction oscillator of laminated metal construction, usually of nickel.

In FIG. 5 is shown the action of the transducer sleeve or nipple 30. The sleeve 30 will be subjected to a high frequency alternating or pulsating current of the order of 10,000 to 50,000 cycles per second.

Inside of the nozzle 30 will pass the braided tubular member 25 where it will be subjected to the concentrating hyper or ultra sonic vibrations 32.

Inside of the braided tube there desirably will be employed a core of an inert metal or hard rubber or a wire sleeve which will hold the impregnated braiding 25 in expanded condition.

The hypersonic or ultrasonic vibration will be concentrated on the outer surface of the mandril 31 resulting in a thorough impregnation of the braided material.

The final tubing after passing through the transducer sleeve 30 may then be subjected to curing. This hypersonic or ultrasonic treatment will assure a substantial integral union of the braided material and the plastic material.

In heating the braided tubing at 18 in FIG. 3 before its impregnation, the degree of heat should be kept at a lesser point than the curing heat but sufficient to enhance the combination of the braid 25 and the plastic 20.

Desirably, where the yarns or braids are impregnated between successive applications of braid or before the braiding operation, a flexible resin or plastic or a resin or plastic that must be dried should be employed. The flexible or dryable resin plastic after application to the yarn or braid and/or after drying may be reheated and then may be cured after being coated with a catalyst or after a catalyst has been applied. This operation may be repeated several times with several dryings and with or without several curings and applications of resin.

Although thermosetting resins are preferred, as in FIGS. 3 and 6, thermoplastic resins may also be utilized, as in FIG. 4.

Referring to the embodiment of FIG. 6, the braided tube 70 is passed through a heating element 71 and then through a liquified resin impregnating bath 72. After passing through the liquified resin impregnating bath 72 the braided tube will pass through the transducer 73 which may be of the barium titanate form. The tube is then passed through another final bath 74, and outwardly as indicated at 75 to a curing operation.

Figure 7:
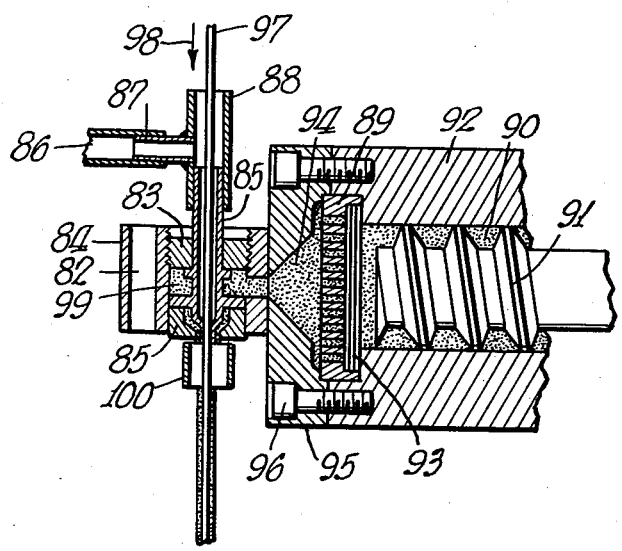
FIG. 7 is a diagrammatic side sectional view showing an alternative impregnating procedure for thermoplastic resinous material.

In the device of FIG. 7 the resinous material 90 may be forced by a screw 91 through the tubular extrusion head or cylinder wall 92 which includes heating elements. It will then be forced through the screen back 93 and through the conical chamber 94 and the breaker plate 89 in the head plate 95. This head plate is held in position by means of the bolts 96. The tubular braided material is indicated at 97 and it will be passed downwardly as indicated by the arrow 98 through the tubular element 88 which has an attachment at 87 to the connection to the vacuum at 86. The extruded resinous material at 99 is forced around the braided tube 97 and the tube then passes downwardly through the guider tip 85 and outwardly through the transducer 100 where it will be thoroughly impregnated with the resinous material which has been forced outwardly by the screw 91. The die head 85 will be positioned before the transducer 100 and assure uniformity of coating. The cross-head 84 is also provided with a back-up screw 83 and with a cartridge heating element which is positioned in the opening 82.

This arrangement as shown in FIG. 7 is particularly suitable in connection with thermoplastic resinous materials such as styrene, cellulose acetate, nylon, polyethylene, rubber, methyl methacrylate, ethyl cellulose, and the like, where relatively elevated temperatures above 300° F. are to be utilized. These thermoplastic materials are not subsequently cured.

On the other hand, with thermosetting resins such as urea formaldehyde resins, melamine formaldehyde resins and various types of phenolic resins, the impregnation may take place at a much lower temperature than below 300° F. and the curing temperature ranging from 300° to 400° F. for several minutes will convert the resin into its final insoluble, infusible condition.

Although a heavy denier rayon has been found to be most suitable for making the braid because of its absorptive properties in respect to the plastic or the setting resins, it is also possible to use mixtures or single fibres such as cotton, wool, nylon, glass, metal and the like, in composing the braid. The braid also may be formed of ribbons or previously braided strands, which may have been braided of yarns, fibres or rovings and which may have been previously heated or impregnated with resinous or plastic materials.

The various coating and impregnating processes may take place in stages with various coatings and impregnations being applied in succession with or without intermediate heating, curing or other treatments. For example, the braiding machine may be arranged in superimposed relation with the braid in tubular form constantly passing upwardly and with there being intermediate resin coating or impregnating devices applying resin to the successive layers of braid as each braid is formed upon the inner braid until the final tubular structure consists of a series of braids and a series of resinous layers superimposed on one another. The different superimposed braids may be of different material, and the inner or outer braids may be of glass fiber while the inner braids may be of nylon or rayon or even cotton. Similarly, different types of resins may be employed with the inside resinous coatings being thermoplastic while the outside resinous coatings are thermosetting. Hot air or electric heating devices may also be applied to heat the braided material intermediate the coating operations, as well as before any coating is applied, and heat may also be applied to the yarns before and after they are impregnated with thermosetting or thermoplastic resins.

In general the thermosetting resins are applied in a liquid bath which may contain an organic solvent or water and which employs a temperature of less than 300° F., while thermoplastic resins are desirably extruded in molten or liquid condition and at temperatures in excess of 300° F.

As many changes could be made in the above system of forming reinforced hollow circular plastic objects, and many widely different embodiments of this invention could be made without departing from the scope of the claims, it is intended that all matter contained in the above description shall be interpreted as illustrative and not in a limiting sense.

Among the various synthetic plastics which may be used, the epoxy or epichlorhydrin may be satisfactorily processed with prevention of quick curing by taking the glass or rayon yarn, passing it through the epoxy resin solution which contains aryl diamine catalyst followed by drying.

The yarn may be stored or wound on spools and kept in this condition without resin changing to final stage.

When desired, the yarn so impregnated may be braided with or without additional resin coating and cured at an elevated temperature over 300° F.

This same procedure may be applied with other thermosetting resins where a catalyst is included which will not be effective to convert the resin to infusible condition until curing temperatures are employed.

With these thermosetting resins the impregnation with the liquid or dissolved resin may be aided by using titanate transducer.

Having now particularly described and ascertained the nature of the invention, and in what manner the same is to be performed, what is claimed is:

1. A laminated wall tubing composed of concentric cylindrical layers of tubular braided textile materials composed of synthetic textile fibers or yarns, said braided materials being of varying angular direction in respect to the longitudinal axis and being impregnated interiorly and coated exteriorly including the fibres and yarns themselves with a thermosetting resin, and longitudinally extending strands located in and enclosed by said tubular braided textile material, the outer braided material being more tightly braided than the interior braided material.

2. The tubing of claim 1, wherein the tubular braided textile materials are composed of heavy denier rayon.

3. The tubing of claim 1, wherein the tubular braided textile materials are composed of glass roving or yarn.

4. The tubing of claim 1, wherein the braided textile materials have resinous coatings of thermoplastic resin on the interior face and resinous coatings of thermosetting resins on the exterior face.

References Cited in the file of this patent

UNITED STATES PATENTS

| | | |
|---|---|---|
| 486,621 | Stowe | Nov. 22, 1892 |
| 513,982 | Chick | Feb. 6, 1894 |
| 757,877 | Bosch | Apr. 19, 1904 |
| 1,093,915 | Cobb | Apr. 21, 1914 |
| 1,455,359 | Schulthess | May 15, 1923 |
| 1,978,211 | Loughead | Oct. 23, 1934 |
| 2,383,733 | Parker | Aug. 28, 1945 |
| 2,552,599 | Stout | May 15, 1951 |
| 2,594,838 | Alexander | Apr. 29, 1952 |
| 2,614,058 | Francis | Oct. 14, 1952 |
| 2,653,887 | Slayter | Sept. 29, 1953 |
| 2,690,412 | Nebesar | Sept. 28, 1954 |
| 2,690,769 | Brown | Oct. 5, 1954 |
| 2,747,616 | DeGanahl | May 29, 1956 |

OTHER REFERENCES

Glass Reinforced Plastics by Phillip Morgan, published by Philosophical Library, Inc., N.Y., N.Y., 1995, pages 44, 46, and 47 relied on. (Copy in Div. 15.)